(12) United States Patent
Oh

(10) Patent No.: US 11,079,264 B2
(45) Date of Patent: Aug. 3, 2021

(54) PORTABLE MULTI-NOZZLE AIR FLOW METER

(71) Applicant: Seoul Industry Engineering Co., Ltd., Namyangju-si (KR)

(72) Inventor: Sang Taek Oh, Namyangju-si (KR)

(73) Assignee: Seoul Industry Engineering Co., Ltd., Namyangju-si (KR)

( * ) Notice: Subject to any disclaimer, the term of this patent is extended or adjusted under 35 U.S.C. 154(b) by 321 days.

(21) Appl. No.: 16/245,848

(22) Filed: Jan. 11, 2019

(65) Prior Publication Data

US 2020/0222917 A1    Jul. 16, 2020

(51) Int. Cl.
*G01F 1/36* (2006.01)
*G01F 1/34* (2006.01)
*G01F 1/40* (2006.01)
*B05B 1/14* (2006.01)

(52) U.S. Cl.
CPC ............. *G01F 1/36* (2013.01); *B05B 1/14* (2013.01); *G01F 1/34* (2013.01); *G01F 1/40* (2013.01)

(58) Field of Classification Search
CPC ..... B05B 1/14; G01F 1/34; G01F 1/42; G01F 1/36; G01P 5/14
See application file for complete search history.

(56) References Cited

FOREIGN PATENT DOCUMENTS

| KR | 20100135024 | * | 12/2010 | ............... G01F 1/42 |
| KR | 101415882 | * | 8/2014 | ............... B60H 3/00 |
| KR | 2015005764 | * | 1/2015 | ............... G01F 1/34 |
| KR | 101512808 | * | 4/2015 | ............... G01F 1/34 |

OTHER PUBLICATIONS

KR 101512808 translation, 2015 (Year: 2015).*
KR 20100135024 translation, 2010 (Year: 2010).*
KR 2015005764 translation, 2015 (Year: 2015).*
KR 101415882 translation, 2014 (Year: 2014).*

* cited by examiner

*Primary Examiner* — Eric S. McCall
*Assistant Examiner* — Timothy P Graves
(74) *Attorney, Agent, or Firm* — Rabin & Berdo, P.C.

(57) ABSTRACT

A portable multi-nozzle air flow meter. A nozzle cover is attached to a front portion of a cylindrical housing. A nozzle panel is attached to an inner portion of the nozzle cover, with a central insertion hole being defined in a central portion thereof, such that a measuring nozzle is detachably inserted into the central insertion hole. The nozzle panel includes a sealing portion provided an inner peripheral portion of the central insertion hole. One or more fixed nozzles arranged in the nozzle panel in a circumferential direction about the measuring nozzle, such that a cross-sectional area thereof is adjustable depending on an amount of air flow discharged from a duct.

1 Claim, 17 Drawing Sheets

PORTABLE MULTI-NOZZLE AIR FLOW METER

BACKGROUND

Field

The present disclosure relates to an air flow meter. More particularly, the present disclosure relates to a portable multi-nozzle air flow meter for accurately measuring the air flow of discharged air in an air conditioning system of a building, an air conditioning system of a vehicle, an electronic appliance using air, or the like.

Description

To measure air velocity of an air conditioning system, a simple measuring method using a hot wire, a vane anemometer, or the like is generally used. However, is difficult to move a typical anemometer, due to large volume and weight thereof.

To overcome this problem, a portable anemometer having a nozzle, fabricated on the basis of American Society of Heating, Refrigerating and Air-Conditioning Engineers (ASHRAE) Standard 51-1999, was developed. However, this portable anemometer tends to have low measurement accuracy in a low air flow measurement range, due to high internal flow resistance, and high measurement errors in a high air flow measurement range, due to due to unstable flow. It is necessary to reduce such drawbacks.

That is, an improvement is required in the portable anemometer of the related art in order to reduce measurement errors occurring in a low volume range (5 to 255 CMH) due to internal flow resistance and unstable airflow. In addition, there is another problem of slow data processing rate due to analog signal processing.

In addition, the portable anemometer of the related art has measurement, correction, and maintenance-related problems, since the portable anemometer has neither a self-diagnosis function nor a control correction function.

Portable anemometers for precisely measuring air in small duct structures have been developed and commercially distributed. However, it is inappropriate apply such portable anemometers to small ducts for vehicle air conditioning systems, due to the structure thereof designed to be applied to air conditioning diffusers for buildings. Accordingly, the structure of related-art portable anemometers must be improved in order to be applied to vehicle air conditioning systems.

In addition, since static pressure is not correct, an amount of air flow in an outlet varies during measurement, thereby making it impossible to accurately measure the amount of air flow. Furthermore, it is difficult to measure an accurate state of air from the measured value, since a temperature, humidity, atmospheric pressure, or the like is not considered.

Accordingly, it can be appreciated from above that it is required to develop anemometers for air conditioning systems and there is market demand for such technology. However, such an anemometer has not been provided yet, because of lack of technology. Accordingly, development of an accurate anemometer is urgently demanded.

The information disclosed in the Background section is only provided for a better understanding of the background and should not be taken as an acknowledgment or any form of suggestion that this information forms prior art that would already be known to a person skilled in the art.

BRIEF SUMMARY

According to ASHRAE Standard 51-1999, predetermined spaces must be provided in front and rear of a measuring nozzle, i.e. an air flow measuring sensor, and a pipe connected to an outside structure is necessary to provide a static pressure tap for measuring a pressure difference. These requirements increase the size of an anemometer, and the outside pipe is difficult to maintain. These factors are obstacles against miniaturization of the anemometer. To provide a portable anemometer with which air flow can be easily measured at fields, it is necessary to develop an anemometer having a structure which can reduce damage during movement while miniaturizing the size of the anemometer.

Various aspects of the present disclosure provide a portable multi-nozzle air flow meter that can measure air flow in consideration of a temperature, humidity, and atmospheric pressure and minimize an error range of measurements. In addition, the portable multi-nozzle air flow meter can be moved without being damaged, so that air flow can be easily measured at fields.

According to an aspect, a portable multi-nozzle air flow meter may include: a nozzle cover attached to a front portion of a cylindrical housing; a nozzle panel attached to an inner portion of the nozzle cover, with a central insertion hole being defined in a central portion thereof, such that a measuring nozzle is detachably inserted into the central insertion hole, the nozzle panel including a sealing portion provided an inner peripheral portion of the central insertion hole; and one or more fixed nozzles arranged in the nozzle panel in a circumferential direction about the measuring nozzle, such that a cross-sectional area thereof is adjustable depending on an amount of air flow discharged from a duct.

According to another aspect, a portable multi-nozzle air flow meter may include: a body having defined an inlet and an outlet, through which air is intaken and discharged, and including a power supply to provide power to the air flow meter; a refining unit disposed between the inlet and an opening and closing unit to alleviate mobility air intaken through the inlet; a measuring nozzle detachably coupled to a central portion of a nozzle panel, with an air measuring hole being provided in a central portion of the measuring nozzle to measure and then discharge an amount of air; the opening and closing unit including a protrusion member reducing resistance reaction force of air discharged from the air measuring hole and a damper provided integrally with the protrusion member to open and close the air measuring hole, such that air discharged from the air measuring hole is prevented from being reintroduced into the air measuring hole; and a blower including a fan providing air to kinetic energy and driving the fan, so that air discharged from the air measuring hole is discharged through the outlet.

According to further another aspect, a portable multi-nozzle air flow meter may include: a duct-connecting unit into which air is introduced; a refining unit alleviating mobility of air intaken through the inlet; a measuring nozzle measuring an amount of air passing through the refining unit; a blower disposed in rear of the measuring nozzle, and including a motor, a fan working in concert with the motor to intake air, measurement of which is completed, and a heat dissipation member dissipating heat generated during operation of the motor; and a body connected to the duct-connecting unit, and accommodating the refining unit, the measuring nozzle, and air intaking means therein.

The methods and apparatuses of the present disclosure have other features and advantages that will be apparent from, or are set forth in greater detail in the accompanying drawings, which are incorporated herein, and in the following Detailed Description of the Invention, which together serve to explain certain principles of the present disclosure.

BRIEF DESCRIPTION OF THE DRAWINGS

The above and other objects, features, and advantages of the present disclosure will be more clearly understood from the following detailed description when taken in conjunction with the accompanying drawings, in which.

DETAILED DESCRIPTION

Figure 1:
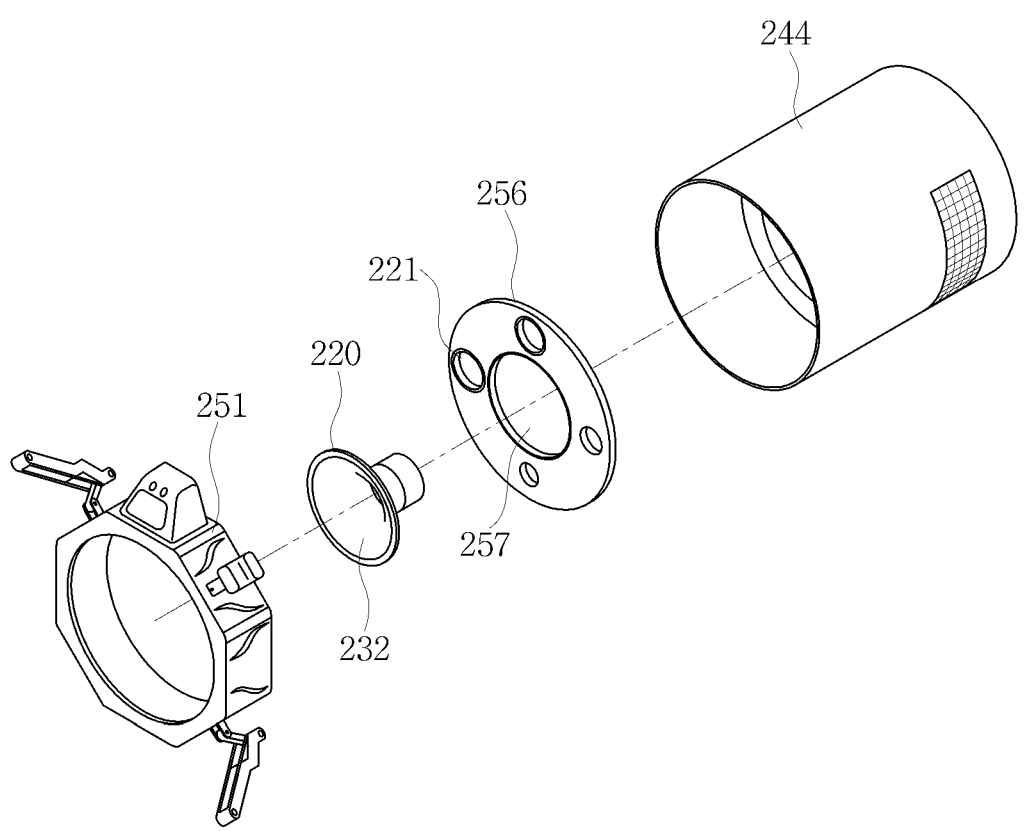
FIGS. 1 and 2 are exploded perspective views illustrating a portable multi-nozzle air flow meter according to an exemplary embodiment.
Figure 2:
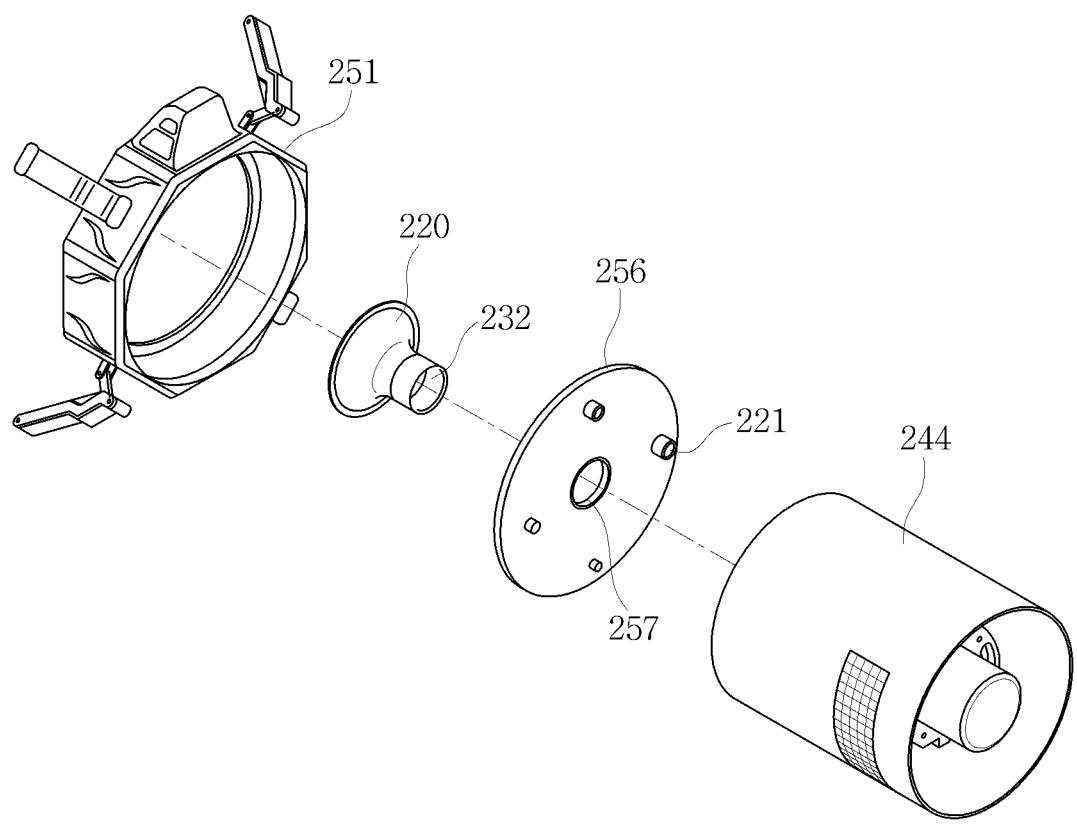
Figure 3:
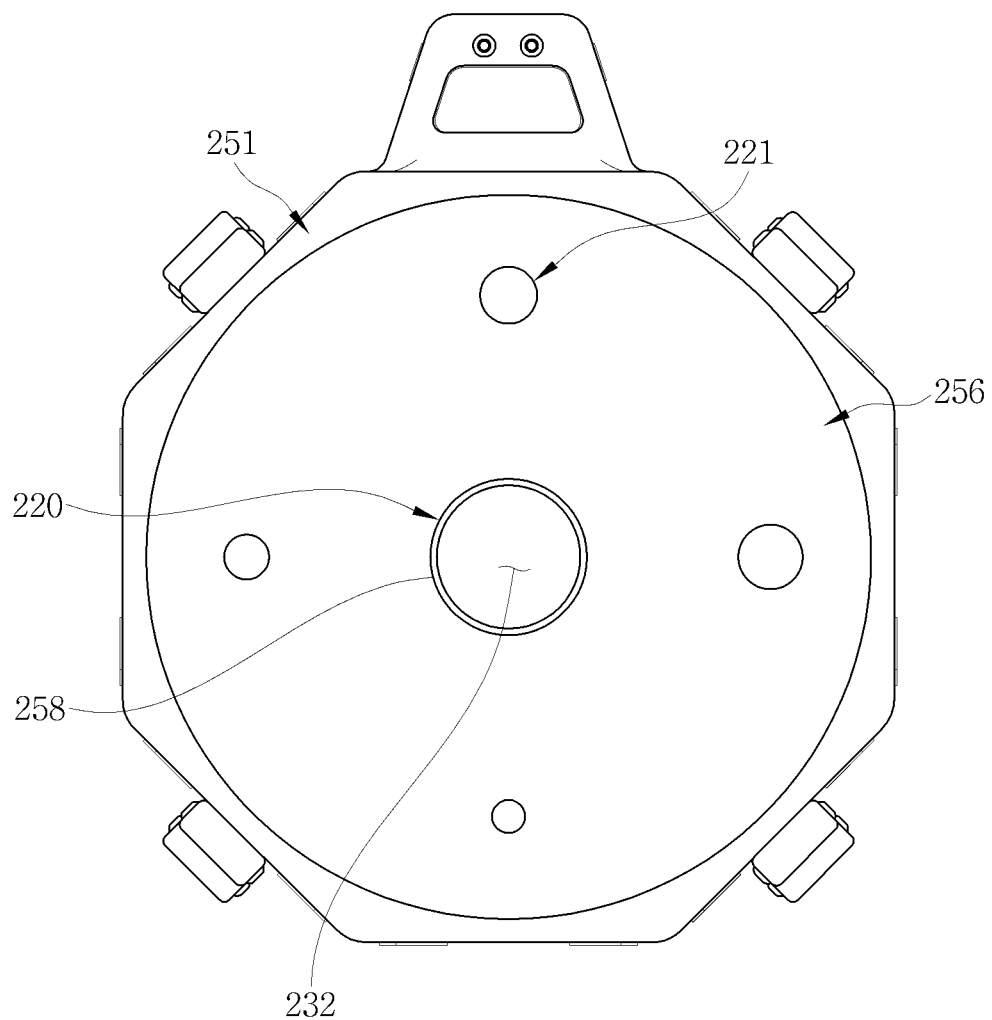
FIG. 3 is a front elevation view illustrating the portable multi-nozzle air flow meter according to an exemplary embodiment.
Figure 4:
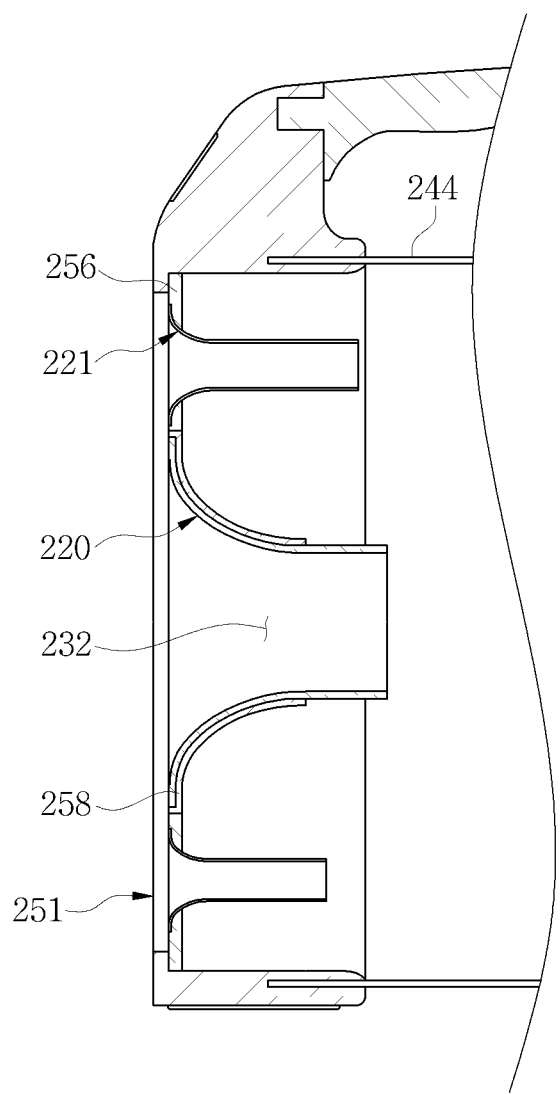
FIG. 4 is an enlarged cross-sectional view illustrating portions of the assembled portable multi-nozzle air flow meter according to an exemplary embodiment.

A basic design structure of a portable multi-nozzle air flow meter according to exemplary embodiments has been developed using a measuring nozzle based on ANSI/ASHRAE Standard 51-1999.

As is well known in the art, air has characteristics of a viscous fluid. When air is ejected from a duct or a fan, a fluid scraping or swirling phenomenon is inevitably caused due to a boundary layer effect. Thus, it is virtually impossible to measure air flow on the basis of average fluid velocity.

Therefore, to measure air flow or aerodynamic performance of a fan or the like having a medium and large air flow, a special air plenum according to ANSI/ASHRAE Standard 51-1999 is disposed, multipoint measurement is performed using a multi-nozzle method or using a Pitot tube in an outlet, and then, results of the multipoint measurement are averaged to calculate average fluid velocity. Finally, the calculated average fluid velocity is converted into air flow. In another method, air flow is measured using a method according to a differential pressure method according to ISO-5167.

The present disclosure has been conceived to systematically solve all of the above problems and allow easy and precise measurement to be applied in an industrial field. The present disclosure has been conceived based on ANSI/ASHRAE Standard 51-1999 which is the international standard industrial standard.

Hereinafter, a portable multi-nozzle air flow meter according to exemplary embodiments will be described in detail with reference to the accompanying drawings.

As illustrated in FIGS. 1 to 4, a portable multi-nozzle air flow meter according to an exemplary embodiment includes a nozzle cover 251 attached to a front portion of a cylindrical housing 244, a nozzle panel 256 attached to an inner portion of the nozzle cover 251 and including a measuring nozzle 220 disposed so as to be inserted into a central portion thereof, and a fixed nozzle 221 disposed on the nozzle panel 256.

Here, an inflow cover 242 is attached to the front portion of the nozzle cover 251. The nozzle cover 251 is perforated in an axial direction thereof such that air introduced from a refining unit 210 is introduced toward the nozzle panel 256. The nozzle cover 251 is attached to the front portion of the cylindrical housing 244, and the nozzle panel 256 is attached to the inside of the nozzle cover 256.

The measuring nozzle 220 may be detachably inserted into and coupled to the nozzle panel 256 so as to be replaced at any time. The measuring nozzle 220 measures the temperature, humidity, and static pressure of air when measuring an amount of air passing through the refining unit 210.

The measuring nozzle 220 is formed to extend through the air flow meter in an axial direction of the air flow meter. The measuring nozzle 220 is formed to extend through a central portion of an air measuring hole 232 so as to measure an amount of air introduced by flowing through suction force of an blower (see 230 of FIG. 6). The measuring nozzle 220 may be detachably disposed on a central portion of the nozzle panel 256 and may be replaced at any time.

That is, since the measuring nozzle 220 is inserted into and coupled to a central insertion hole 257 of the nozzle panel 256 to be detachably attached to the nozzle panel 256, the measuring nozzle 220 may be, for example, configured to be replaceable at any time or selectively detached from and attached to the nozzle panel 256 so as to adjust the diameter of the nozzle having a cross-sectional area as required, depending on air flow or a breakdown of the measuring nozzle 220, when measuring the air flow discharged from a duct.

The nozzle panel 256 is attached to the inside of the nozzle cover 251, and the measuring nozzle 220 is detachably inserted into and coupled to the central portion of the nozzle panel 256. When measuring introduced air flow, the nozzle panel 256 allows the air flow to be measured by satisfying a cross-sectional area of the nozzle required according to the air flow, without the replacement of the measuring nozzle 220.

The nozzle panel 256 has the central insertion hole 257 in the central portion thereof, and the fixed nozzles 221 are disposed on nozzle panel 256, for example, circumferentially around the central insertion hole 257.

Here, the central insertion hole 257 is formed axially to extend through the central portion of the nozzle panel 256, such that the measuring nozzle 220 may be mounted and detachable. The nozzle panel 256 has a sealing portion 258 on an inner peripheral portion of the central insertion hole 257 to increase a coupling force between the central insertion hole 257 and the measuring nozzle 220, such that pressure of introduced air is precisely measured without being lost.

The sealing portion 258 may be made of silicone or soft rubber. Since an adhesive is applied on the sealing portion 258 or applied on a surface of the sealing portion 258 in a phlegmatic state, the measuring nozzle 220 is tightly coupled to the central insertion hole 257 by a pressure expansion force, whereby air flow may be easily measured without loss of pressure.

The fixed nozzles 221 are axially perforated in a central portion thereof. The fixed nozzles 221 are disposed on the nozzle panel 256, for example, circumferentially around the central insertion hole 275 to measure air flow, temperature, humidity, and static pressure of introduced air like the measuring nozzle 220.

For example, the fixed nozzles 221 may include first to fourth nozzles and may be provided in the nozzle panel 256. Since the first to fourth nozzles are configured to have different cross-sectional areas, i.e. different nozzle diameters, without detachably attaching a separate nozzle or the measuring nozzle 220, having a cross-sectional area required according to air velocity of an air flow introduced when the air flow is measured, various air flows may be measured by satisfying the cross-sectional area required according to the air flow introduced through first to fourth nozzles 221 when the air flow is measured.

In addition, since the fixed nozzles 221 are detachably disposed in the nozzle panel 256, a plurality of fixed nozzles 221 are combined to satisfy a cross-sectional area of a nozzle required according to an air flow when the air flow is measured, thereby more conveniently measuring various air flows.

For example, in the fixed nozzles 221, when air velocity required according to air flow during measurement of the air flow is 3, the fixed nozzle 221 having a nozzle diameter of 1 and the fixed nozzle 221 having the nozzle diameter of 2 may be combined to overlap nozzle diameters and satisfy a cross-sectional area required according to the air velocity of 3, thereby measuring air flow.

Since various nozzle diameters are combined and used, air flow may be more precisely measured as compared with the conventional method in which air flow has been measured using a nozzle diameter corresponding to air velocity.

In other words, when an air flow having an air velocity of 3 is measured, without using a nozzle formed to have a diameter, i.e., a cross-sectional area required according to a value of air velocity by replacing the fixed nozzle 221, the plurality of fixed nozzles 221 having the nozzle diameters of 1 and 2, i.e., cross-sectional areas may be combined to satisfy a cross-sectional area having a value corresponding to the value of the air velocity, thereby measuring the air flow.

Here, the nozzle cover 251 and the nozzle panel 256 according to an exemplary embodiment may further include a warning sensor configured to transmit a guide signal to a controller according to whether the measuring nozzle 220 is attached to, or detached from, the nozzle cover 251 or the nozzle panel 256.

That is, since the warning signal is transmitted to the controller according to whether the measuring nozzle 220 and the fixed nozzle 221 are coupled, a user may easily check a coupling state of the nozzle through the controller to precisely measure the air flow.

Therefore, according to an exemplary embodiment, it is possible to measure static pressure, average pressure, differential pressure, temperature, and humidity of air discharged from an air conditioner system for a vehicle, small and medium sized fans, and various air ducts, it is possible to conveniently replace a nozzle, and it is possible to precisely measure air flow by satisfying a cross-sectional area according to the air flow using a plurality of nozzles without replacing a nozzle.

Figure 5:
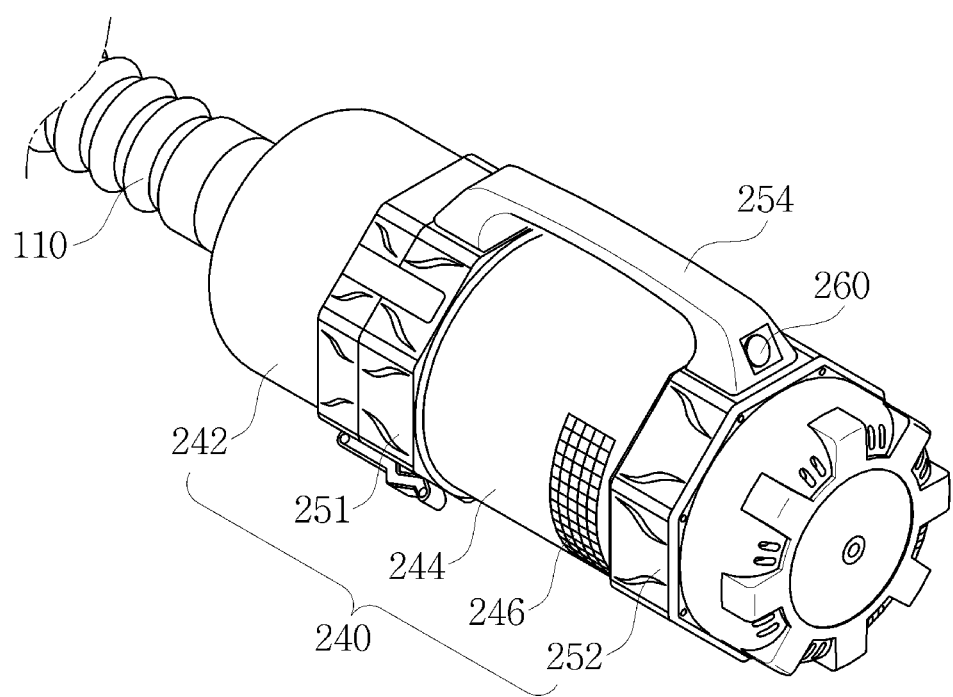
FIG. 5 is a perspective view illustrating the assembled portable multi-nozzle air flow meter according to an exemplary embodiment.
Figure 6:
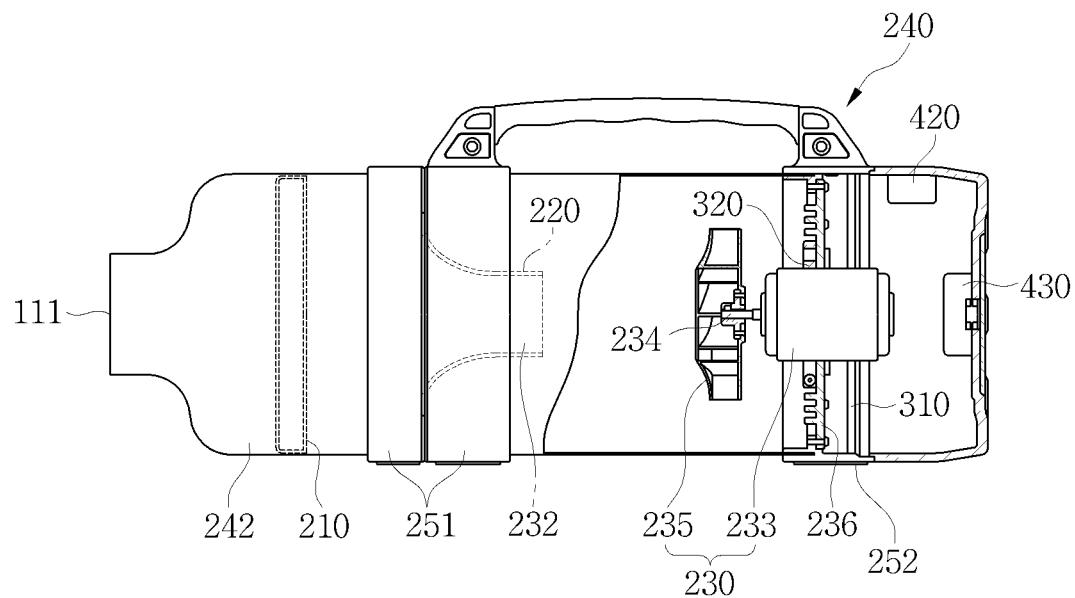
FIG. 6 is a partial cross-sectional view illustrating the assembled portable multi-nozzle air flow meter according to an exemplary embodiment.
Figure 7:
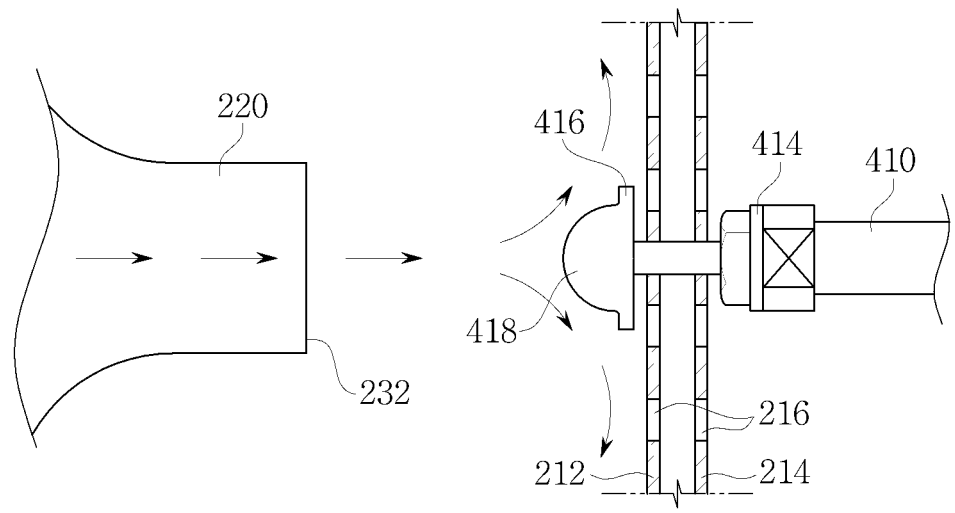
FIGS. 7 to 10 are enlarged views illustrating key portions of the portable multi-nozzle air flow meter according to an exemplary embodiment.

As illustrated in FIGS. 5 to 7, the portable multi-nozzle air flow meter according to an exemplary embodiment includes a main body 240 configured to allow air to be efficiently introduced and discharged and protect inner components from the outside. The portable multi-nozzle air flow meter includes an opening and closing unit 410 configured to selectively open and close the refining unit 210 configured to alleviate mobility of air intaken through an inlet 111 and the measuring nozzle 220 configured to measure air flow.

In addition, the portable multi-nozzle air flow meter includes the blower 230 configured to efficiently discharge air measured by the measuring nozzle 220, a sensor 260 configured to measure a variety of types of information regarding temperature, humidity, pressure, and the like of the air intaken through the inlet 111, and a controller 420 configured to calculate air flow measured by the measuring nozzle 220.

For example, the main body 240 may be made of a synthetic resin so as to be externally protected from external pressure or foreign substances such as dust. The main body 240 may have the inlet 111 formed in one end thereof, through which air is intaken from the atmosphere and an outlet 246 formed in one surface thereof, through which the air intaken through the inlet 111 is discharged and may be equipped with a power supply 430.

The refining unit 210 may be a kind of porous plate configured to mitigate fluidity of air generated due to the air being intaken through the inlet 111. The refining unit 210 may be comprised of a porous, asymmetric plate in which an interval between pores is gradually increased in the direction from the center to the periphery so as to uniformize a flow swirl and flow velocity distribution of air and reduce pressure loss.

The refining unit 210 may include first and second panels 212 and 214 spaced apart from each other. A plurality of flow holes 216 may be formed in the first and second panels 212 and 214, such that mitigated air passes through the plurality of flow holes 216.

That is, the refining unit 210 stabilizes air having high fluidity intaken through the inlet 111 by allowing the air to sequentially pass through the first and second panels 212 and 214 having the plurality of flow holes 216 such that the air is precisely measured by the measuring nozzle 220.

The measuring nozzle 220 may be a component configured to measure the air mitigated by the refining unit 210. At least one measuring nozzle 220 may be provided so as to efficiently measure an amount of air introduced through the inlet 111. For example, at least one, up to eight, measuring nozzles 220 may be operated.

In addition, in order to discharge the air through the outlet 246 after measuring the amount of the air introduced through the inlet 111, the measuring nozzle 22 may be configured such that the air measuring hole 232 is formed in the center thereof, thereby allowing air to be efficiently moved.

The opening and closing unit 410 may be provided and operated in a number equal to the number of the measuring nozzles 220 provided in the nozzle panel 256. A rear diameter of the air measuring hole 232 may be equal to a front end diameter of the opening and closing unit 410, such that the opening and closing unit 410 is inserted into a rear portion of the measuring nozzle 220 to completely seal the air measuring hole 232.

Furthermore, the opening and closing unit 410 is disposed inside the main body 240 so as to be positioned on the same centerline as the air measuring hole 232 of the measuring nozzle 220 and functions to selectively open or close the measuring nozzle 220 according to an amount of the air introduced though the inlet 111.

The opening and closing unit 410 includes a fixing member 414, a medium coupled to the main body 240, and a damper 416 disposed at a front end of the opening and closing unit 410 and configured to seal the measurement hole 232.

The damper 416 has a size equal to a diameter of the air measuring hole 232 so as to seal the air measuring hole 232. A protrusion member 418 including a certain protrusion is integrally formed with the damper 416 outside the damper 416, such that air discharged through the air measuring hole 232 collides with the opening and closing unit 410, and thus, an air backflow phenomenon is prevented.

The protrusion member 418 may be formed outside the damper 416 to have a certain size and may have a size smaller than the diameter of the air measuring hole 232 so as to be inserted into the air measuring hole 232 and provide airtightness from the damper 416.

In addition, when air measured by the measuring nozzle 220 extends through the opening and closing unit 410 and is discharged through the outlet 246, the protrusion member 418 may prevent an air back phenomenon in which the damper 416 and the protrusion member 418 of the opening and closing unit 410 block a flow of air in the outlet 246, so that air does not reversely enter the air measuring hole 232 or continuously whirls between the measuring nozzle 220 and the opening and closing unit 410.

Figure 8:
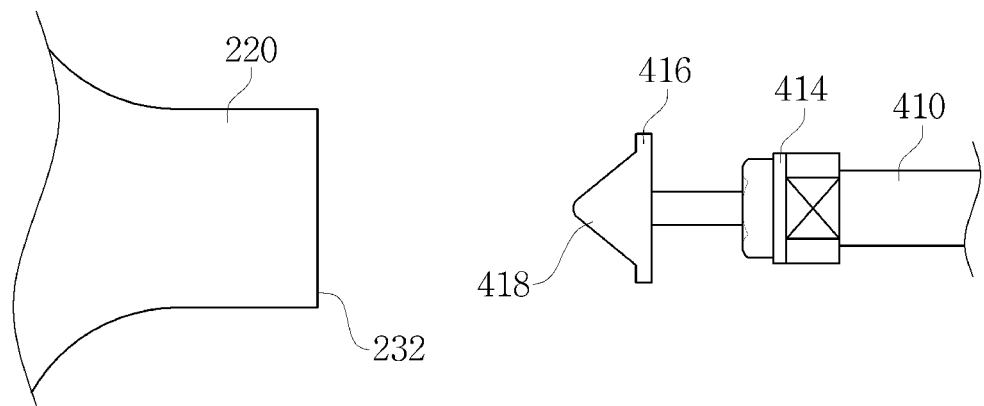
Figure 9:
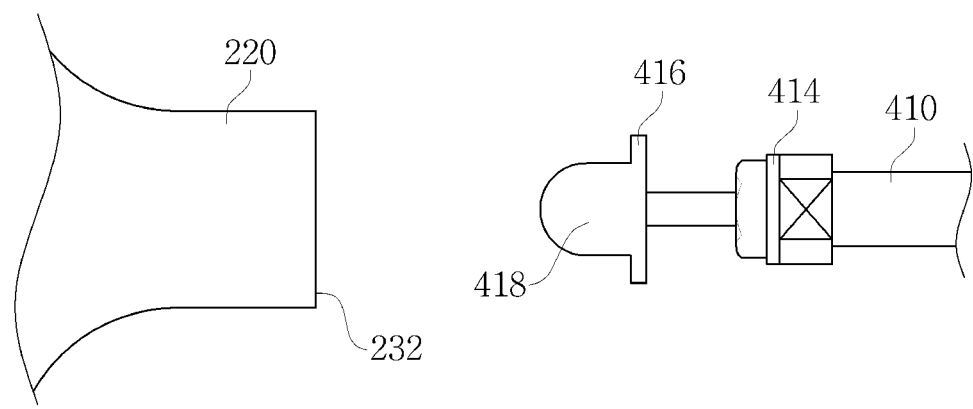
Figure 10:
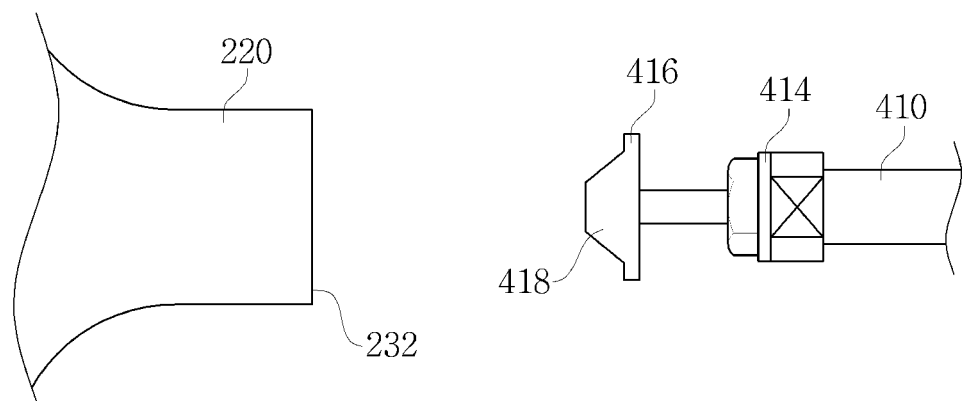

As illustrated in FIGS. 8 to 10, the protrusion member 418 may be configured to have a curved outer circumferential surface that can minimize an airbag phenomenon, or may be configured to have a triangular, trapezoidal, or elliptical cross-sectional shape that can minimize air resistance reaction force that air, discharged from the air measuring hole 232, would have due to the opening and closing unit 410.

According to exemplary embodiments, the opening and closing unit 410 including the protrusion member 418 having a curved, triangular, trapezoidal, or elliptical shape can minimize air resistance reaction force when a distance from the measuring nozzle 220 is maintained to be less than 2.5 feet, although the distance from the measuring nozzle 220 has been maintained to be 2.5 feet or greater in the related art to prevent the airbag phenomenon in air discharged from the measuring nozzle 220.

That is, according to exemplary embodiments, the size can be minimized by maintaining the distance between the opening and closing unit 410 and the measuring nozzle 220 in a range from 0.5 to 2.5 feet. Here, air can be easily and efficiently discharged through the outlet 246 even in the case that the distance between the measuring nozzle 220 and the opening and closing unit 410 is less than 2.5 feet.

Returning to FIGS. 5 and 6, the blower 230 is configured to efficiently discharge exiting air, measured by the measuring nozzle 220, toward the outlet 246, and is disposed in a rear portion of the main body 240 to apply kinetic energy to air within the body 240, so that air introduced from the inlet 111 can be discharged to the outlet 246 through the measuring nozzle 220.

The blower 230 includes a fan 235 configured to create a current of air in the direction of the outlet and a motor 233 driving the fan 235.

The sensor 260 is configured to measure a variety of types of information until an amount of air, introduced from the inlet 111, is measured by the measuring nozzle 220. For example, the sensor 260 may be disposed on a upper end of the main body 240. The controller 420 may be disposed within the main body 240.

For example, the sensor 260 may include a temperature and humidity sensor measuring a temperature and humidity of air, an atmospheric pressure sensor measuring an atmospheric pressure, a differential pressure sensor measuring a difference in pressure between a front portion and a rear portion of the measuring nozzle 220, a discharge static pressure sensor measuring an amount and static pressure of air discharged from the blower 230, and an intake static pressure sensor measuring an amount and static pressure of air intaken.

As illustrated in FIGS. 5 and 6, the portable multi-nozzle air flow meter according to an exemplary embodiment includes the refining unit 210 and the measuring nozzle 220. The refining unit 210 is connected to, for example, a duct system via a connecting pipe 110 to reduce the mobility of air discharged from the duct and introduced into the connecting pipe 110, so that not only an amount of air, but also a static pressure, temperature, humidity, and the like of air, can be measured. The measuring nozzle 220 measures an amount of air that has passed through the refining unit 210.

In addition, the portable multi-nozzle air flow meter includes the blower 230 intaking and discharging air, the measurement of which is completed, the main body 240 connected to the connecting pipe 110 and accommodating air flow measuring components therein, and a handle 254 detachably disposed on a upper portion of the main body 240 to improve portability. The sensor 260 measuring the static pressure of air is provided in the handle 254.

The blower 230 is disposed in the rear of, and spaced apart from, the measuring nozzle 220. The blower 230 intakes air that has passed through the measuring nozzle 220 to discharge air, the measurement of which is completed, and prevents loss of air, the measurement of which is completed, so that such air is not reintroduced toward the sensor 260.

The blower 230 includes the motor 233 providing driving force by which air that has passed through the measuring nozzle 220 can be intaken and the fan 235 working in concert with a rotary shaft 234 of the motor 233 to intake and discharge air. In addition, a heat dissipation member 236 dissipating heat generated during operation of the motor 233 may further be provided.

Figure 11:
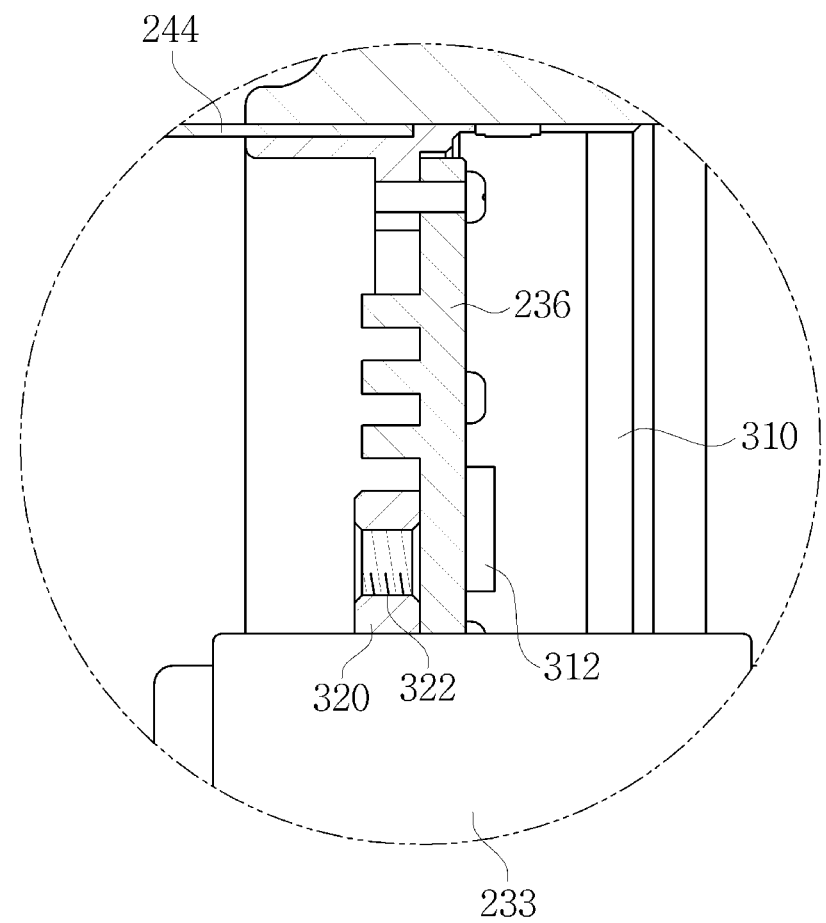
FIGS. 11 and 12 are enlarged cross-sectional views illustrating key portions of FIG. 6.

Here, the heat dissipation member 236 may be made of, for example, an aluminum material to function as a heat sink, and be provided between the motor 233 and a printed circuit board (PCB) 310 to dissipate heat from the PCB 310 and a semiconductor device 312 (see FIG. 11). The PCB 310 is configured to be electrically controllable, while the semiconductor device 312 functions as a power module.

The blower 230 is disposed in the cylindrical housing 244 to be situated in the rear of, and spaced apart from, the measuring nozzle 220 so as to prevent loss of air that has passed through the measuring nozzle 220 while guiding air toward the fan 235.

The motor 233 is a component providing one-directional rotational force by which air that has passed through the measuring nozzle 220, i.e. air flow, the measurement of which is completed, can be intaken. The motor 233 has the rotary shaft 234 provided on the leading end. A clamp 320 is provided on the outer circumferential surface of the motor 233, and is fixedly coupled to the heat dissipation member 236.

Figure 12:
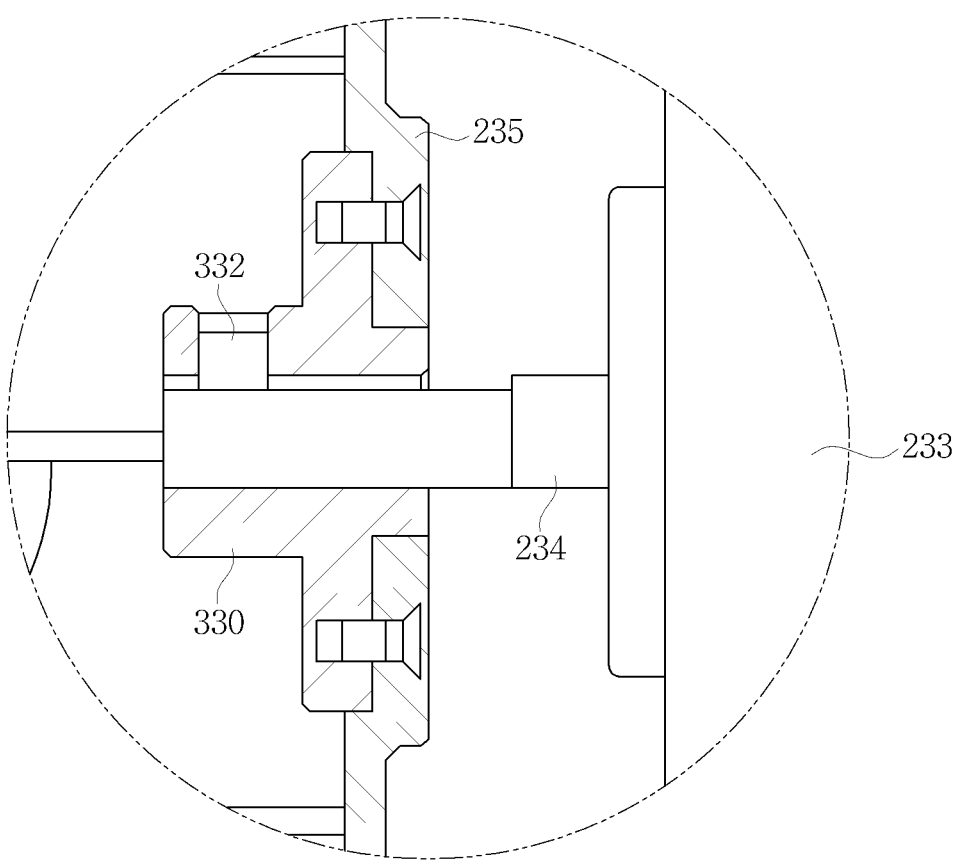
Figure 13:
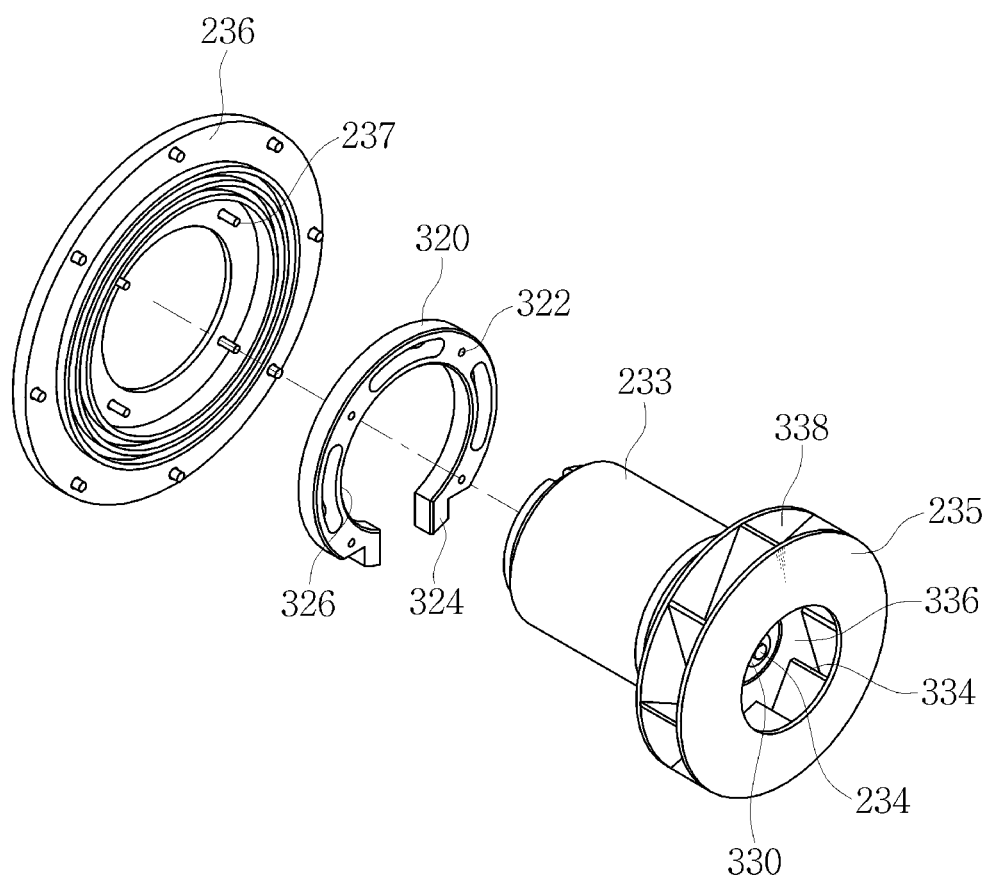
FIG. 13 is an enlarged perspective view illustrating key portions of FIG. 6.
Figure 14:
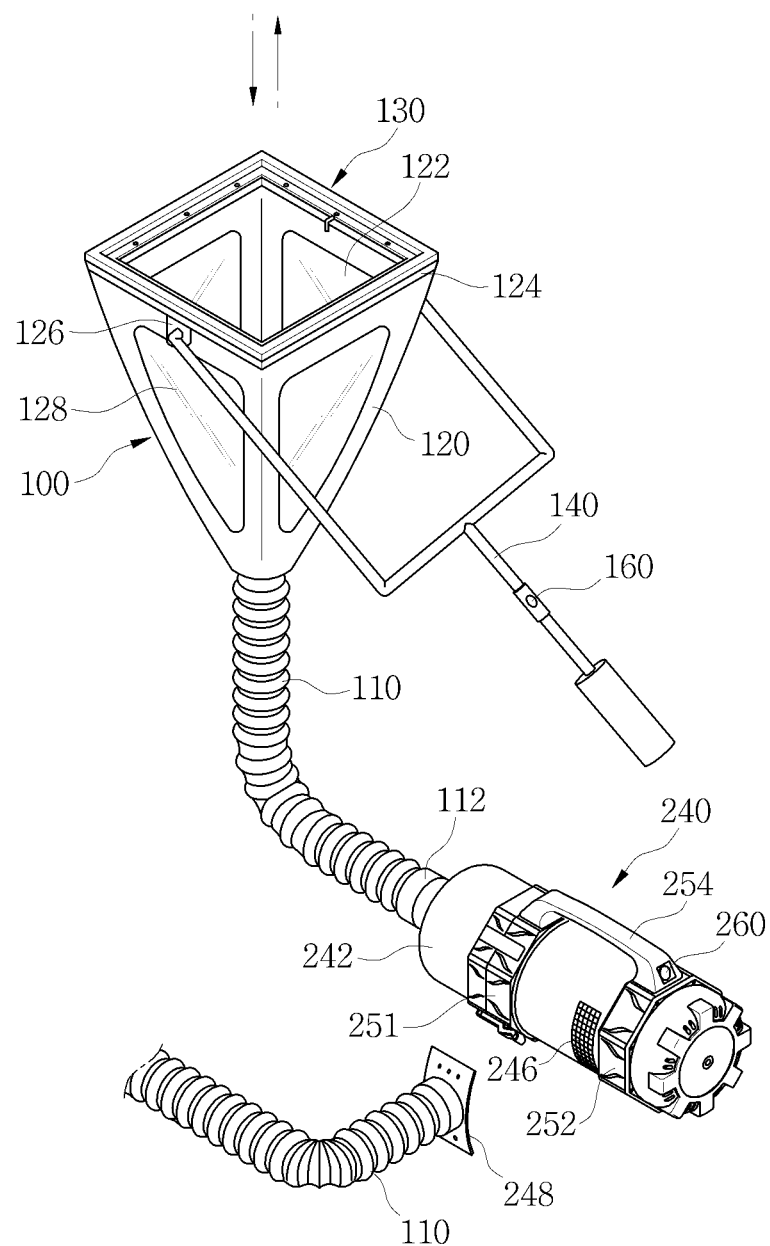
FIG. 14 is a perspective view illustrating the assembled portable multi-nozzle air flow meter according to an exemplary embodiment.
Figure 15:
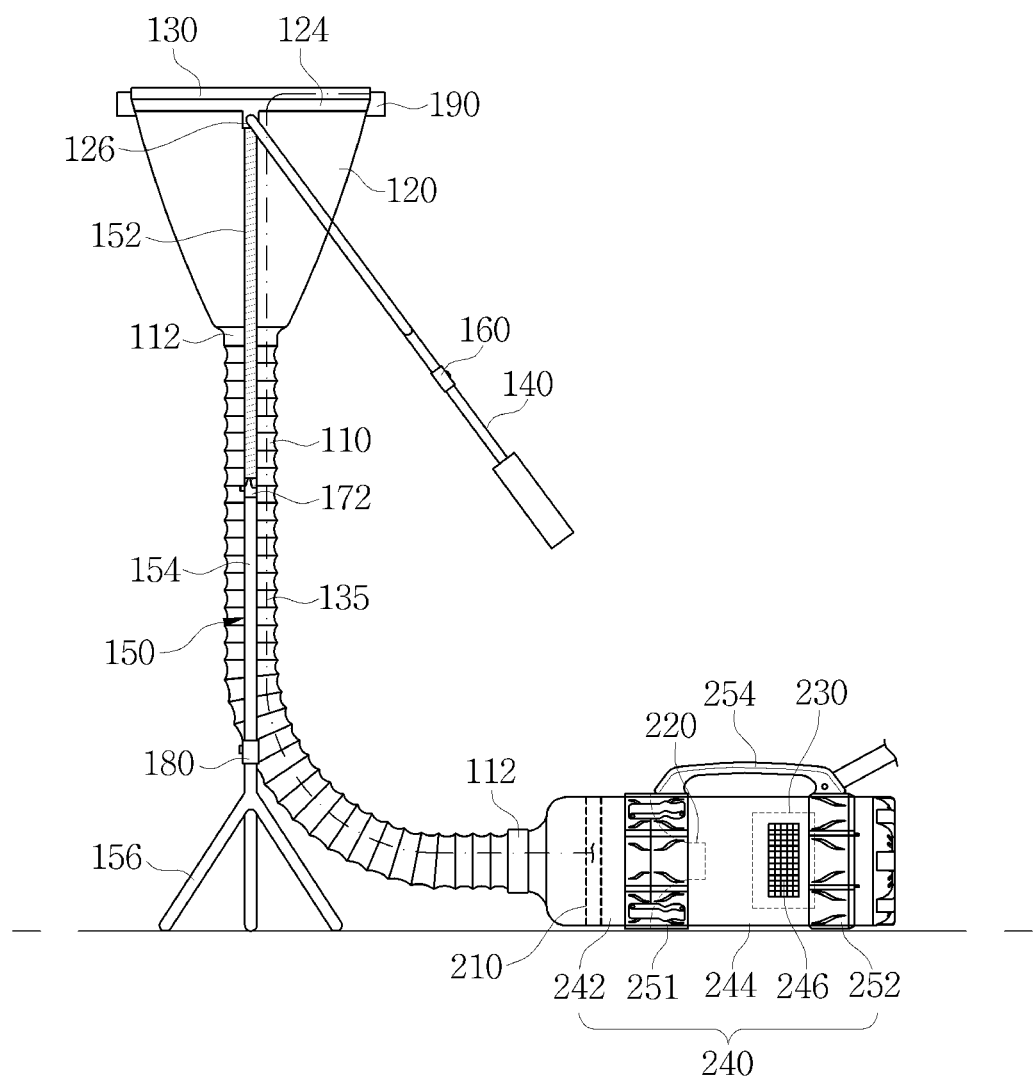
FIGS. 15 to 17 are perspective views illustrating the assembled portable multi-nozzle air flow meter according to an exemplary embodiment, as well as applications thereof.
Figure 16:
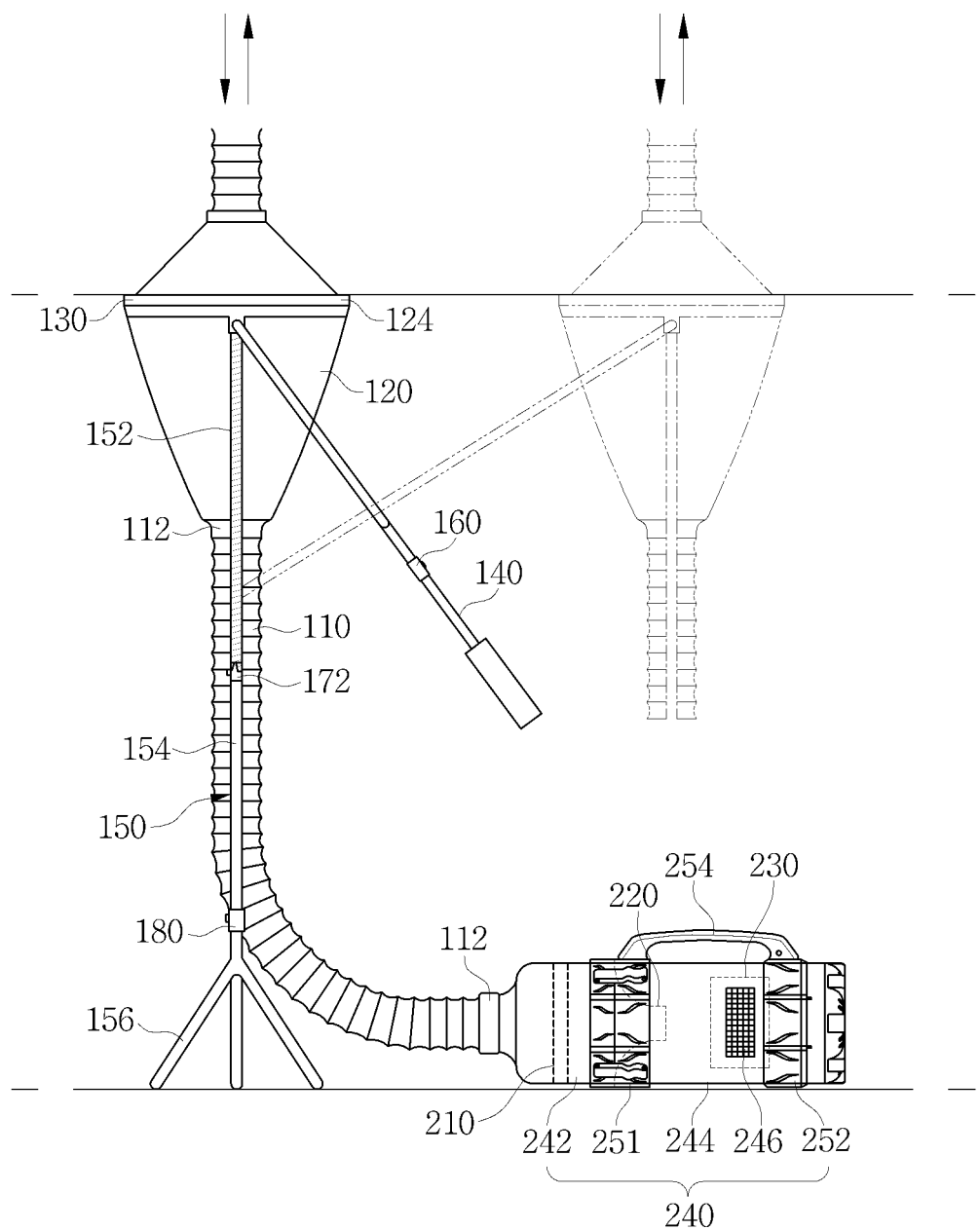
Figure 17:
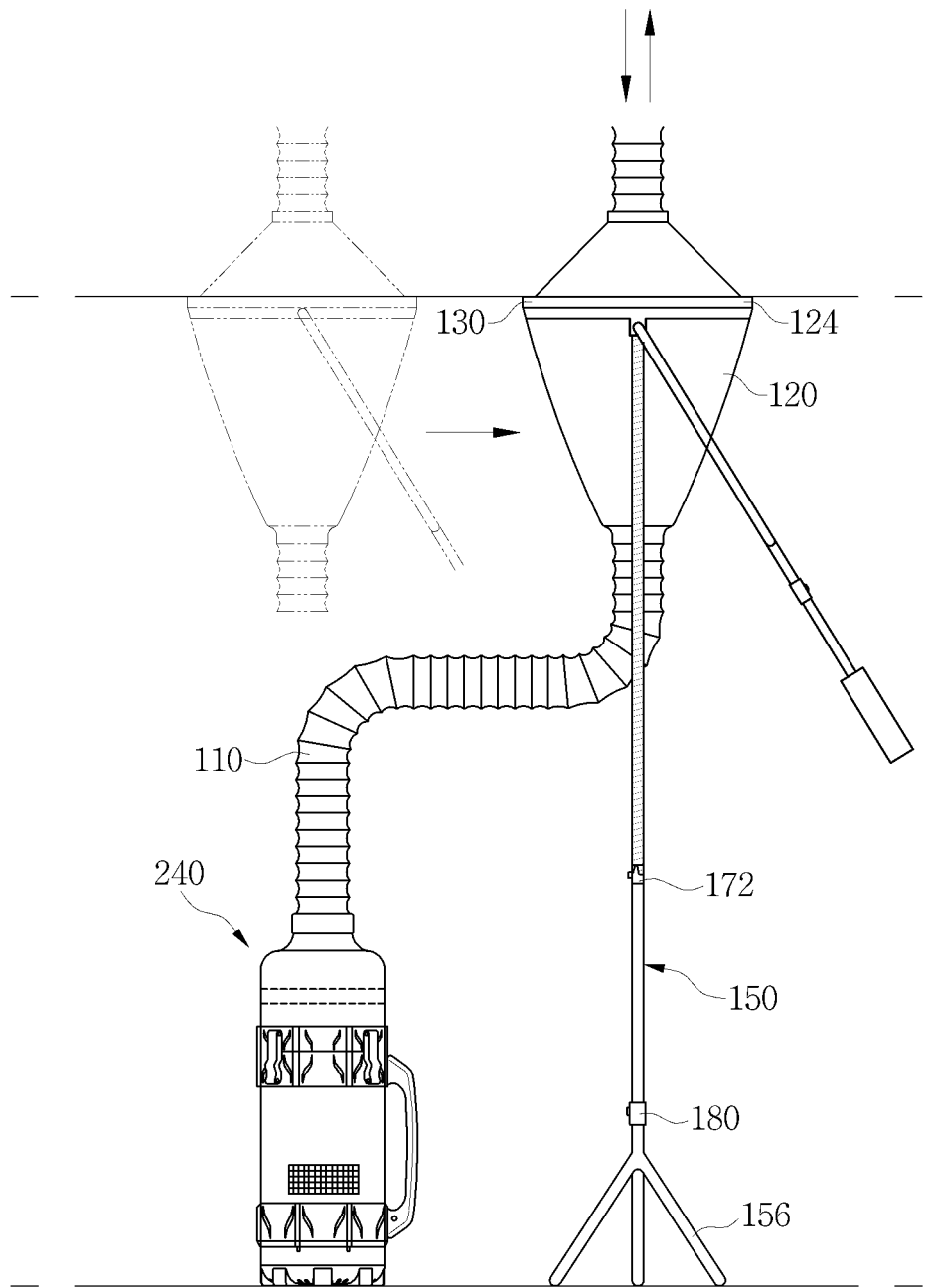

As illustrated in FIGS. 11 to 13, the clamp 320 is a fixing device fixedly connecting the motor 233 and the heat dissipation member 236. The clamp 320 has a fixing hole 326 defined in the inner area thereof and opened downward. The fixing hole 326 is configured to surround the motor 233 while allowing the motor 233 to extend therethrough. Coupling flanges 324 are provided on the open end of the fixing hole 326 to connect the clamp 320 and the motor 233.

In addition, the clamp 320 may be fastened to the heat dissipation member 236 using a fastening device, such as screws or bolts. The clamp 320 may have fastening holes 322 arranged in the outer circumference, such that fixing protrusions 237 provided on the heat dissipation member 236 may be fitted into the fastening holes 322.

The clamp 320 tightly holds the motor 233 inserted into the fixing hole 326 thereof by connecting the coupling flanges 324 using a fastening device. The clamp 320 is fastened to the heat dissipation member 236, such that the motor 233 and the heat dissipation member 236 are fixedly connected.

The fan 235 is a component fixedly coupled to the rotary shaft 234 to rotate in response to operation of the motor 233 so as to intake air passing through the measuring nozzle 220. The fan 235 has an intake hole 336 in a front portion, the intake hole 336 allowing air, the measurement of which is completed, to be introduced therethrough in response to rotation of the motor 233, and discharge holes 338 in outer circumferential portions, the discharge holes 338 allowing introduced air to be discharged therethrough.

Here, the fan 235 includes blades 335 configured to rotate in one direction in response to operation of the motor 233 to intake air, the measurement of which is completed, toward the intake hole 336. Introduced air is intaken by rotational force of the blade 335 so as to be discharged through the discharge holes 338.

The fan 235 is fixedly coupled to the motor 233 via a connecting member 330. The outer circumference of the connecting member 330 is fastened to the fan 235 using a fastening device. The rotary shaft 234 of the motor 233 is inserted into a central portion of the connecting member 330, and is fixed to the connecting member 330 using a locking pin 332, such that the fan 235 and the motor 233 are fixedly connected.

Returning to FIGS. 5 and 6, the main body 240 includes an inflow cover 242 configured to prevent loss of air introduced through the connecting pipe 110 to measure air flow. The inflow cover 242 is connected to the connecting pipe 110.

In addition, the main body 240 further includes the nozzle cover 251 attached to the inflow cover 242, with the measuring nozzle 220 being disposed inside of the nozzle cover 251. The handle 254 is provided on the upper portion of the nozzle cover 251. The handle 254 can be easily gripped to improve the portability of the air flow meter so that the air flow meter can be conveniently moved.

Here, inside of the handle 254, the sensor 260 may be connected to a pressure-measuring tap 130 (see FIG. 18) of a duct-connecting unit 100 via, for example, an air hose. The sensor 260 measures a static pressure of air, a temperature and humidity of air, measures a difference between the pressure of air discharged from the duct and the pressure of air passing through the pressure-measuring tap 130, and measures a static pressure of air discharged through the outlet.

In addition, a fixing cover 252 may be provided in the rear of the main body 240 to be spaced apart from the nozzle cover 251. The heat dissipation member 236 of the blower 230 may be fixedly coupled to the fixing cover 252. Accordingly, the cylindrical housing 244 is disposed between the nozzle cover 251 and the fixing cover 252, with both ends of the cylindrical housing 244 being attached to the nozzle cover 251 and the fixing cover 252

As illustrated in FIGS. 14 to 17, the portable multi-nozzle air flow meter according to an exemplary embodiment includes the duct-connecting unit 100 connected to the duct system to convey air discharged from the duct to the air flow meter. In addition, the portable multi-nozzle air flow meter includes the refining unit 210, the measuring nozzle 220, the blower 230, the main body 240, and the sensor 260 connected to the connecting pipe 110 of the duct-connecting unit 100 to measure not only an amount of air, but also a static pressure, temperature, humidity, and the like of air.

The refining unit 210 may be provided with a plurality of air holes communicating with the connecting pipe 110 of the duct-connecting unit 100 to reduce the mobility of air introduced from the duct-connecting unit 100.

The measuring nozzle 220 may be provided with an air measuring hole to measure an amount of air that has passed through the refining unit 210. The air measuring hole may extend in the axial direction to measure an amount of air, on the basis of suction force of the blower 230. In addition, the blower 230 is configured to intake air that has passed through the measuring nozzle 220 and discharge the intaken air outwardly. The blower 230 may include a motor and a fan.

The main body 240 is connected to the duct-connecting unit 100 to prevent loss of air, which is introduced for air flow measurement. The main body 240 includes the inflow cover 242 connected to the connecting pipe 110 of the duct-connecting unit 100.

In addition, the main body 240 includes the cylindrical housing 244, the nozzle cover 251, and the fixing cover 252. The cylindrical housing 244 accommodates the measuring nozzle 220 and the blower 230 therein. The inflow cover 242 is inserted into the nozzle cover 251, and the measuring nozzle 220 is fixed to the nozzle cover 251. The fixing cover 252 causes the blower 230 to be located coaxially with the measuring nozzle 220.

The outlet 246, through which air intaken by the blower 230 is discharged, is provided in a side portion of the cylindrical housing 244.

The main body 240 is provided with the handle 254 that can be easily gripped to improve the portability of the air flow meter so that the air flow meter can be conveniently moved. Both ends of the handle 254 are fixedly coupled to the nozzle cover 251 and the fixing cover 252.

The sensor 260 may be provided within the handle 254 to be connected to the pressure-measuring tap 130 of the duct-connecting unit 100 via an air hose 135 to measure a static pressure, temperature, and humidity of air, measure a difference between the pressure of air discharged from the duct and the pressure of air passing through the pressure-measuring tap 130, and measures a static pressure of air discharged through the outlet.

The duct-connecting unit 100 may include a duct hopper 120 into which air is introduced, the pressure-measuring tap 130 fixedly coupled to the upper portion of the duct hopper 120 to measure a pressure of air discharged from the duct, a support handle 140 with which the duct hopper 120 can be easily located on a high location, such as a ceiling of a building, and a support frame 150 supporting the duct hopper 120.

The upper end of the duct-connecting unit 100 is fixed to, for example, the duct of the duct system, while the lower end of the duct-connecting unit 100 is connected to the inflow cover 242 via the connecting pipe 110, such that the duct-connecting unit 100 causes air discharged from the duct to be intaken or intaken air to be discharged.

The connecting pipe 110 has first plates 112 on both ends, in which the first plates 112 are connected to the duct hopper 120 and the inflow cover 242. The first plate 112, provided on the upper end of the connecting pipe 110, is connected to the duct hopper 120, such that air, introduced to the duct hopper 120, is supplied to the main body 240. The first plates 112 may be provided with a leak prevention packing member therein, the leak prevention packing member being able to prevent air, introduced from the duct hopper 120, from leaking outwardly.

The connecting pipe 110 may be implemented as a bellows, such that the length thereof is easily adjustable. According to this configuration, the duct-connecting unit 100 can be easily disposed on a ceiling of a building.

The duct hopper 120 is made of a flexible material, such as vinyl or polyvinyl chloride (PVC), and is detachably connected to the first plate 112 provided on the upper portion of the connecting pipe 110. In addition, the duct hopper 120 has an air container 122 in an upper portion, such that air is introduced into the air container 122. A fixing flange 124 is provided on the inner circumference of the air container 122, and the duct hopper 120 is fixed to a ceiling of a building or the like using the fixing flange 124.

The fixing flange 124 is configured to surround outer circumferential portions of the upper portion of the duct hopper 120, and the fixing flange 124 may be provided with hinges 126 on both side portions thereof, allowing the support handle 140 to pivot. Here, when the support frame 150 is connected to the hinges 126, the duct hopper 120 may be reliably fixed.

The duct hopper 120 may be provided with a transparent window 128 through which introduction of air can be visually recognized from outside and the coupling state of the duct hopper 120 can be checked.

The pressure-measuring tap 130 is a component coupled to the fixing flange 124 of the duct hopper 120 to measure an amount, a static pressure, and average pressure of air when air is being introduced into the air container 122 of the duct hopper 120.

Figure 18:
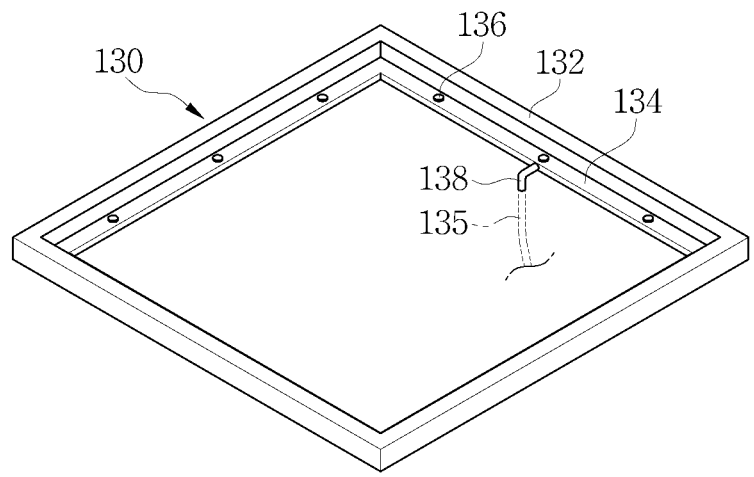
FIG. 18 is a perspective view illustrating the pressure-measuring tap of the portable multi-nozzle air flow meter according to an exemplary embodiment.

As illustrated in FIG. 18, the pressure-measuring tap 130 is in the shape of a rectangular frame, and is disposed on the fixing flange 124 of the duct hopper 120 to communicate with the air container 122. The pressure-measuring tap 130 includes a leakage prevention portion 132 provided in the upper surface to prevent discharged air from leaking and a static pressure tap 134 provided in the inner portion to measure a static pressure of air.

Pressure measuring holes 136 are arranged in the static pressure tap 134 to measure a pressure of introduced air passing therethrough. An average pressure port 138 is provided inside of the static pressure tap 134 to measure an average pressure of introduced air.

The average pressure port 138 is configured to measure the average pressure of introduced air passing through the static pressure tap 134, and is connected to the sensor 260 via the air hose 135 to measure the average pressure of air.

The static pressure tap 134 may be provided with, for example, a discharge pressure sensor of the sensor 260 and a static sensor to measure values obtained by the pressure measuring holes 136 and the average pressure port 138. The static pressure tap 134 may be configured to transfer data measured by the discharge pressure sensor and the static sensor to the controller.

In addition, a manometer 190 (see FIG. 15) may be provided on a portion of the pressure-measuring tap 130 to correct an error in static pressure occurring during air flow measurement. The manometer 190 corrects an error in air flow measurement by adjusting a difference between the pressure of discharged air and the pressure of air intaken through the blower 230.

Returning to FIGS. 14 to 16, the support handle 140 is configured to allow the duct hopper 120 to be easily located on a high location, such as a ceiling of a building. The support handle 140 may be provided with a length adjusting unit 160 allowing the length of the support handle 140 to be adjusted.

The support frame 150 is configured to support the duct hopper 120, such that discharged air can be reliably introduced into the main body 240 through the connecting pipe 110. The upper end of the support frame 150 is connected to the fixing flange 124 or the hinges 126, while the lower end of the support frame 150 is seated on the ground.

The support frame 150 includes an upper support 152, a lower support 154, a stand 156, an angle adjusting unit 172, and a height adjusting unit 180. The upper support 152 is detachably attached to the fixing flange 124 or the hinges 126 of the duct hopper 120. The lower support 154 is provided below the upper support 152, such that the height of the support frame 150 is adjustable. The stand 156 is fixed to the bottom of the lower support 154, such that the support frame 150 can be reliably disposed on the ground. The angle adjusting unit 172 connects the upper support 152 and the lower support 154, such that the upper support 152 is pivotable with respect to the lower support 154. The height adjusting unit 180 is provided between the lower support 154 and the stand 156, such that the height of the support frame 150 is adjustable.

A buffering unit may further be provided on an outer circumferential portion of the upper support 152 to alleviate the pressure of air, thereby preventing the duct hopper 120 from being separated by the pressure of air introduced into the duct hopper 120.

The angle adjusting unit 172 allows the upper support 152 to pivot, such that the position of the duct hopper 120 can be easily adjusted. The angle adjusting unit 172 may be provided with a pivot recess 176 therein, which allows the upper support 152 to easily pivot, and a pivot controller 174, by which the amount of pivot of the upper support 152 is controlled.

Figure 19:
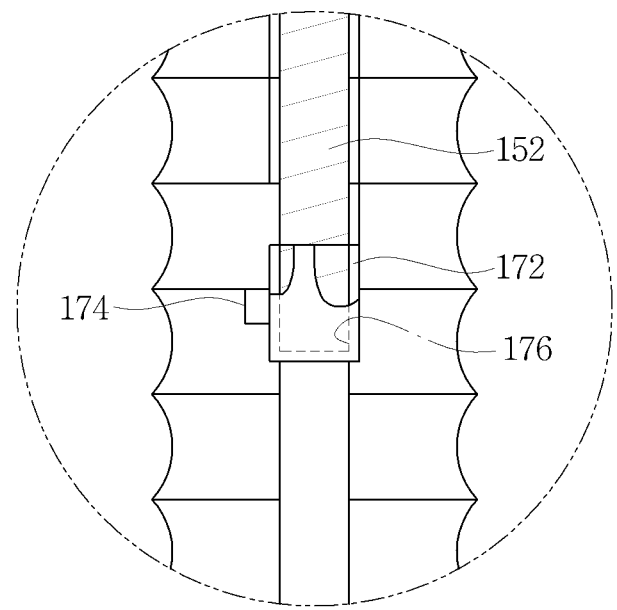
FIGS. 19 and 20 are enlarged views illustrating key portions of FIG. 15.
Figure 20:
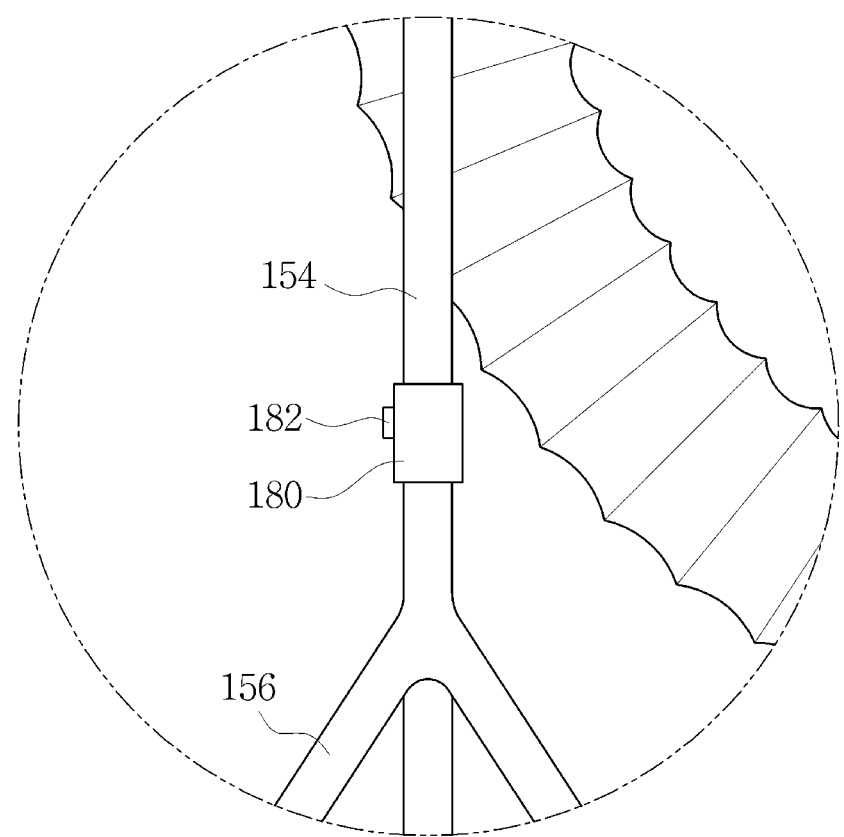

As illustrated in FIGS. 19 and 20, the pivot controller 174 is fastened to the angle adjusting unit 172 by screw fastening, and is configured to control the amount of pivoting of the upper support 152 depending on the degree of fastening.

In addition, the height adjusting unit 180 is configured to surround outer circumferential portions of the lower support 154 and the stand 156, and is provided with a fastening bolt 182. When upward or downward movement of the lower support 154 with respect to the stand 156 is completed, the fastening bolt 182 fixes the lower support 154 to the stand 156 by controlling upward or downward movement of the lower support 154.

That is, the height adjusting unit 180 allows the lower support 154 to move up or down with respect to the stand 156, depending on the degree of fastening of the fastening bolt 182.

Returning to FIG. 14, the duct-connecting unit 100 according to an exemplary embodiment can measure not only a static pressure of air discharged from the inflow cover 242 but also a static pressure of air discharged from the outlet 246 of the cylindrical housing 244. In this regard, the second connecting pipe 110 of the duct-connecting unit 100 may be provided with a second plate 248, by which the connecting pipe 110 can be connected to the cylindrical housing 244.

Example

In order to ensure the reliability of the portable multi-nozzle air flow meter according to an exemplary embodiment, a test of comparing the performance of the portable multi-nozzle air flow meter with the performance of a comparative device having a measurement nozzle, fabricated on the basis of the ANSH/ASHRAE 51-1999, was carried out.

The test was carried out by supplying a predetermined amount of air flow, ranging from 50 SCMH to 300 SCMH, to the comparison device. The portable multi-nozzle air flow meter according to an exemplary embodiment was disposed on the rear end of the duct. Amounts of air flow of both the portable multi-nozzle air flow meter according to an exemplary embodiment and the comparison device were measured three times.

TABLE 1

Specification of Portable Multi-Nozzle Air Flow Meter

| | |
|---|---|
| Flow Rate | 3 to 300 CMH |
| Nozzle | 13 mm (1 EA), 22 mm (1 EA), 35 mm (3 EA) |
| Air Temperature | 40 to 80° C. |
| Relative Humidity | 30 to 95% RH |
| Atmospheric Pressure Range | 80 to 110 kPa |
| Power | 600 W |
| Size | 835 mm (L) × 232 mm (D) × 303 mm (H) |
| Mass | 12 kg |

Result of Comparison Test

The result of the comparison test of the portable multi-nozzle air flow meter according to an exemplary embodiment and the comparison device having the measurement nozzle, fabricated on the basis of ANSI/SAHRAE 51-1999, is as follows.

TABLE 2

| | | | | | | | |
|---|---|---|---|---|---|---|---|
| Compara- | 1 | 50.10 | 100.10 | 150.20 | 200.10 | 250.10 | 300.80 |
| tive | 2 | 49.90 | 100.20 | 150.10 | 200.20 | 250.00 | 299.40 |
| Device | 3 | 50.00 | 100.00 | 150.00 | 200.10 | 249.90 | 300.10 |
| | Avg. | 50.00 | 100.10 | 150.10 | 201.13 | 250.00 | 300.10 |
| Portable | 1 | 50.92 | 101.18 | 151.30 | 201.55 | 252.52 | 302.71 |
| Multi- | 2 | 50.34 | 101.29 | 151.83 | 202.06 | 251.97 | 302.58 |
| Nozzle | 3 | 50.38 | 100.97 | 151.53 | 201.79 | 251.74 | 302.54 |
| Air Flow Meter | Avg. | 50.54 | 101.15 | 151.55 | 201.80 | 252.08 | 302.61 |

According to the result of the comparison test, it can be appreciated that error ratios decrease with increases in the amount of air flow. In addition, it can be appreciated that the portable multi-nozzle air flow meter according to an exemplary embodiment has a very high level of accuracy, compared to the comparison device of the related art used in the field.

Although the present disclosure has been described in detail, the portable multi-nozzle air flow meter according to the present disclosure is not limited thereto. The foregoing descriptions have been presented in order to explain the certain principles of the present disclosure. A person having ordinary skill in the art to which the present invention pertains could make many modifications and variations without departing from the principle of the present disclosure.

The foregoing embodiments disclosed herein shall be interpreted as being illustrative only, while not being limitative, of the principle and scope of the present disclosure.

It should be understood that the scope of the present disclosure shall be defined by the appended Claims and all of their equivalents fall within the scope of the present disclosure.

What is claimed is:

1. A portable multi-nozzle air flow meter comprising:
    a body having defined an inlet and an outlet, through which air is intaken and discharged, and comprising a power supply to provide power to the air flow meter;
    a refining unit disposed between the inlet and an opening and closing unit to alleviate mobility air intaken through the inlet;
    a measuring nozzle detachably coupled to a central portion of a nozzle panel, with an air measuring hole being provided in a central portion of the measuring nozzle to measure and then discharge an amount of air;
    the opening and closing unit comprising a protrusion member reducing resistance reaction force of air discharged from the air measuring hole and a damper provided integrally with the protrusion member to open and close the air measuring hole, such that air discharged from the air measuring hole is prevented from being reintroduced into the air measuring hole; and
    a blower comprising a fan providing kinetic energy to air and a motor driving the fan, so that air discharged from the air measuring hole is discharged through the outlet, wherein the protrusion member has a shape selected from among a triangle, a trapezoid, and an ellipse.

* * * * *